United States Patent
Krondorfer et al.

(10) Patent No.: US 6,701,629 B2
(45) Date of Patent: Mar. 9, 2004

(54) MACHINE TOOL HOLDING DEVICE FOR A CIRCULAR SAW BLADE

(75) Inventors: Harald Krondorfer, Ludwigsburg (DE); Markus Heckmann, Filderstadt (DE); Joachim Schadow, Dettenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/980,992

(22) PCT Filed: Mar. 28, 2001

(86) PCT No.: PCT/DE01/01183
§ 371 (c)(1),
(2), (4) Date: Dec. 6, 2001

(87) PCT Pub. No.: WO01/76836
PCT Pub. Date: Oct. 18, 2001

(65) Prior Publication Data
US 2002/0189111 A1 Dec. 19, 2002

(30) Foreign Application Priority Data
Apr. 11, 2000 (DE) .......................... 100 17 980

(51) Int. Cl.[7] .................. B23D 47/00; F16B 21/00
(52) U.S. Cl. .................. 30/390; 83/698.41; 411/349
(58) Field of Search .................. 30/388–391; 83/666, 83/665, 698.41

(56) References Cited

U.S. PATENT DOCUMENTS

| | | | | |
|---|---|---|---|---|
| 1,459,683 A | * | 6/1923 | Norris | 83/666 |
| 2,970,622 A | * | 2/1961 | Lundell | 83/666 |
| 3,298,409 A | * | 1/1967 | Elson | 30/391 |
| 3,656,393 A | * | 4/1972 | Goellner | 83/666 |
| 3,783,729 A | * | 1/1974 | Parr | 83/666 |
| 3,877,148 A | * | 4/1975 | Huber | 30/391 |
| 3,912,411 A | * | 10/1975 | Moffat | 403/259 |
| 4,120,224 A | * | 10/1978 | Van Steenberg et al. | 83/666 |
| 4,205,572 A | * | 6/1980 | Weiner | 83/666 |
| 4,439,953 A | * | 4/1984 | Block et al. | 451/521 |
| 4,637,170 A | * | 1/1987 | Block | 83/666 |
| 4,637,391 A | * | 1/1987 | Schlein | 30/166.3 |
| 4,657,428 A | | 4/1987 | Wiley | |
| 4,683,683 A | * | 8/1987 | Block | 451/509 |
| 4,730,952 A | | 3/1988 | Wiley | |
| 4,787,147 A | | 11/1988 | Wiley | |
| 4,850,109 A | * | 7/1989 | Kerwin | 83/666 |
| 4,909,113 A | * | 3/1990 | Ischenko et al. | 83/666 |
| 5,388,942 A | * | 2/1995 | Bonacina et al. | 411/432 |
| 5,447,086 A | * | 9/1995 | Wittmaier et al. | 83/666 |
| 5,554,165 A | * | 9/1996 | Raitt et al. | 403/349 |
| 5,667,347 A | * | 9/1997 | Matthews | 411/150 |
| 5,702,415 A | * | 12/1997 | Matthai et al. | 83/698.41 |
| 5,871,322 A | * | 2/1999 | Nakamura | 411/432 |
| 5,902,084 A | * | 5/1999 | Garcia | 411/432 |
| 6,050,741 A | * | 4/2000 | Aultman et al. | 279/62 |
| 6,149,364 A | * | 11/2000 | Maeda | 411/432 |
| 6,439,091 B1 | * | 8/2002 | Dibbern et al. | 83/666 |

FOREIGN PATENT DOCUMENTS

| | | |
|---|---|---|
| DE | 28 43 807 A | 8/1980 |
| DE | 197 18 164 A | 11/1998 |
| EP | 0 770 443 A | 5/1997 |
| EP | 0 904 896 A2 | 3/1999 |
| WO | 99 56904 A | 11/1999 |

* cited by examiner

Primary Examiner—Allan N. Shoap
Assistant Examiner—Jason Prone
(74) Attorney, Agent, or Firm—Michael J. Striker

(57) ABSTRACT

The invention is based on a machine tool receptacle with a slaving device (12, 14, 16, 300), by way of which an insert tool can be operatively connected to a drive shaft (54), wherein the insert tool is operatively connectable to the slaving device (14, 16, 300) via at least one detent element (24, 26, 302), supported movably counter to a spring element (20, 22), which detent element snaps into place in an operating position of the insert tool and fixes the insert tool by positive engagement.

It is proposed that the insert tool is a circular saw blade (18, 32).

13 Claims, 9 Drawing Sheets

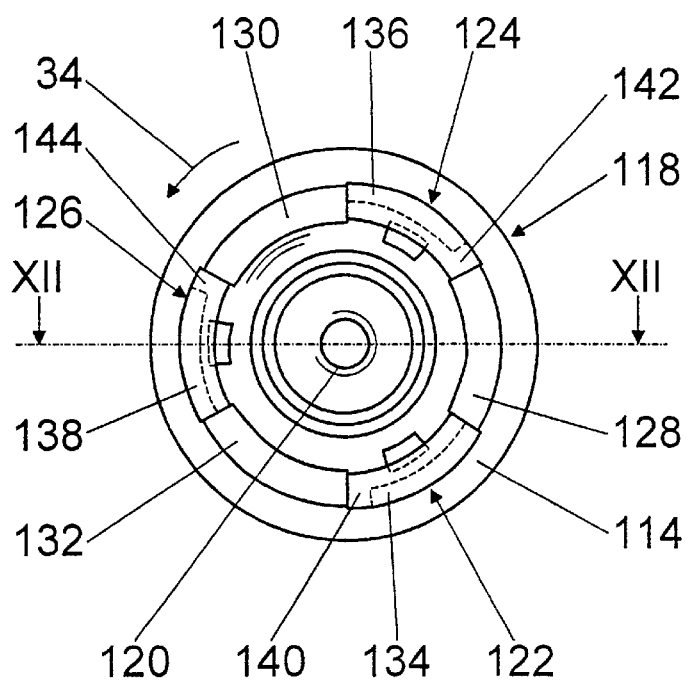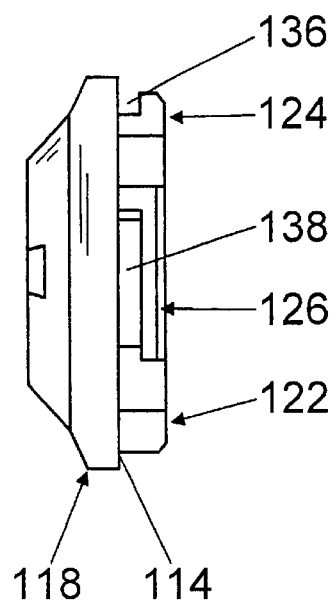
Fig. 10    Fig. 11
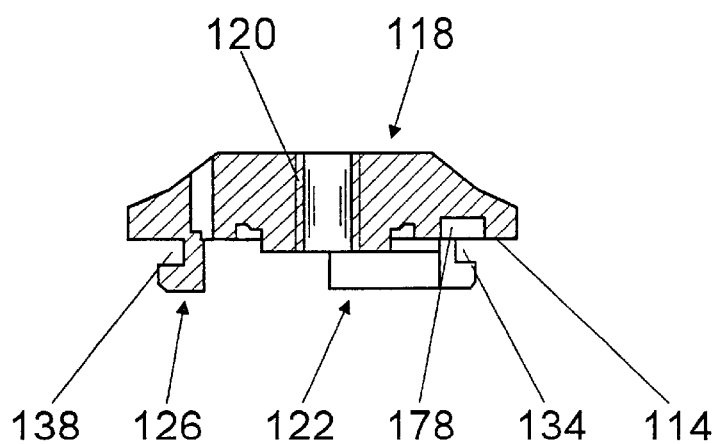
Fig. 12

MACHINE TOOL HOLDING DEVICE FOR A CIRCULAR SAW BLADE

BACKGROUND OF THE INVENTION

The invention is based on a machine tool receptacle.

From European Patent Disclosure EP 0 904 896 A2, a grinding machine tool receptacle for a hand-held angle grinding machine is also known. The angle grinding machine has a drive shaft that has a thread on the side toward the tool.

The grinding machine tool receptacle has a slaving means and a lock nut. For mounting a grinding wheel, the slaving means is slipped with a mounting opening onto a collar of the drive shaft and braced against a bearing face of the drive shaft in the circumferential direction by nonpositive engagement via the lock nut. The slaving means has a collar, extending axially on the side toward the tool, that on two radially opposed sides on its outer circumference has recesses that extend axially as far as a bottom of the collar. From each of the recesses, a respective groove extends on the outer circumference of the collar, counter to a driving direction of the drive shaft. The grooves are closed counter to the driving direction of the drive shaft and taper axially, beginning at the recesses, counter to the drive direction of the drive shaft.

The grinding wheel has a tool hub with a mounting opening, in which two opposed tongues are disposed, pointing radially inward. The tongues can be introduced axially into the recesses and then in the circumferential direction, counter to the driving direction, into the grooves. The grinding wheel is fixed by positive engagement in the grooves in the axial direction via the tongues and by nonpositive engagement by means of the tapering contour of the grooves. During operation, the nonpositive engagement increases as a consequence of reaction forces exerted on the grinding wheel, which act counter to the driving direction.

To prevent the grinding wheel from running off center when the drive shaft is braked by the slaving means, a stopper, which is movably supported in the axial direction in an opening, is disposed in the region of a recess on the circumference of the collar. In a working position where the grinding wheel points downward, the stopper is deflected axially by gravity in the direction of the grinding wheel and closes the groove in the direction of the recess and blocks a motion of the tongue, located in the groove, in the driving direction of the drive shaft.

SUMMARY OF THE INVENTION

The invention is based on a machine tool receptacle, having a slaving device by way of which an insert tool can be operatively connected to a drive shaft; wherein the insert tool is operatively connectable to the slaving device via at least one detent element, supported movably counter to a spring element, which detent element snaps into place in an operating position of the insert tool and fixes the insert tool by positive engagement.

It is proposed that the insert tool is a circular saw blade. By means of the positive engagement, a high degree of safety can be attained, and a simple, economical, tool-less fast-clamping system for a circular saw, especially a circular power saw can be created. The circular saw blade can be securely prevented from running off center, even in the event of braked drive shafts, in which major braking moments can occur.

Because of the movably supported detent element, major deflection of the detent element can be made possible in the assembly of the circular saw blade, and as a result on the one hand a major overlap between two corresponding detent elements, and an especially secure positive engagement, can be realized, and on the other, a readily audible snap-in noise can be achieved, which advantageously tells the user that the snap-in operation has been completed as desired and that the tool is ready for operation.

The detent element can fix the circular saw blade by positive engagement directly or indirectly via an additional component, for instance via a rotatably and/or axially displaceably supported detent lever or tappet and the like coupled to the detent element. The detent element can fix the circular saw blade by positive engagement directly and/or indirectly in various directions, such as the radial direction, axial direction, and/or especially advantageously the circumferential direction. It is also possible that by the positive-engagement fixation of the circular saw blade to the detent element in a first direction, such as the radial direction, the circular saw blade is fixed by positive engagement in a second direction, for instance the circumferential direction, by means of a component separate from the detent element.

The movably supported detent element can be embodied in various forms that appear useful to one skilled in the art, for instance in the form of an opening, protrusion, peg, bolt, and so forth, and can be disposed on the circular saw blade or on the slaving device. The detent element can itself be supported movably in a component at a bearing point, for instance in a flange of the slaving device or in a tool hub of the circular saw blade. Moreover, by means of the positive engagement, an advantageous coding can be attained, so that only intended circular saw blades can be fastened in the machine tool receptacle. The slaving device can be embodied at least in part as a separable adapter part, or it can be joined inseparably to the drive shaft by nonpositive engagement, positive engagement, and/or material engagement.

The detent element can be embodied as movable in various directions counter to a spring element, for instance in the circumferential direction or especially advantageously in the axial direction, as a result of which a structurally simple embodiment is attainable.

In a further feature of the invention, it is proposed that a drive moment can be transmitted via a positive-engagement connection between the circular saw blade and the slaving device. A high drive moment can be securely transmitted, and moreover, a drive moment can be prevented from acting on a nonpositive connection.

If the detent element can be released from its detent position by an unlocking button, then independent separation of the detent connection, for instance by a braking moment, can be securely avoided, and safety can thus be enhanced. Operation of the circular saw blade in two circumferential directions can be made fundamentally possible, and the convenience upon mounting and unmounting of the circular saw blade can be increased.

It is also proposed that the circular saw blade is connectable to the slaving device via a tongue-and-groove connection, which is secured by positive engagement via at least one detent element in an operating position of the circular saw blade. With a tongue-and-groove connection, an especially space-saving, lightweight construction can be attained, in which individual components are used for multiple functions; for instance, the detent element and/or spring elements that engage grooves can be used for radial centering, fixation in the axial direction, and/or fixation in the circumferential direction.

If the circular saw blade is connected to the slaving device in the circumferential direction via at least a first element and in the axial direction via at least a second element, however, then simple and economical tool hubs can be attained, which can advantageously be embodied as flat. The tool hubs can be prevented from catching in production and storage, and good manipulation of the circular saw blade with its tool hubs can be made possible. The components can furthermore be designed advantageously for their function, that is, for either the fixation in the circumferential direction or the fixation in the axial direction. The elements can be formed by a single component or advantageously by separate components. The tool hubs can advantageously be embodied simply, with a closed centering bore, and low-vibration running of the circular saw blade can be made possible. Also, given a suitable choice of the diameter of the centering bore, it can be attained that circular saw blades intended for the machine tool receptacle of the invention can be secured to conventional circular saw blades via already-known fastening devices known, specifically via fastening devices in which the circular saw blade can be fixed by positive engagement in the axial direction and by nonpositive engagement in the circumferential direction on the drive shaft against a bearing face, using a tightening screw or tightening nut.

In a further feature, it is proposed that at least one detent element, extending in the axial direction, snaps into a recess, corresponding to the detent element, of a tool hub of the circular saw blade in an operating position of the circular saw blade and fixes the circular saw blade in the circumferential direction by positive engagement. With a structurally simple embodiment, an advantageous positive engagement in one circumferential direction and preferably in both circumferential directions can be attained. The axially extending detent element can be formed by a separate bolt or by a formed-on peg, the latter made for instance by a deep-drawing operation, and so forth.

Advantageously, at least one detent element extending in the axial direction is secured in a component supported displaceably on the drive shaft counter to the spring element. One and especially advantageously a plurality of detent elements can be well guided on the drive shaft via a large bearing area. Tilting of the detent elements and motion of the detent elements relative to one another can be avoided reliably, and with a spring element that can advantageously be disposed centrally and rotationally symmetrically, a desired spring force for a detent operation can be achieved. However, it is also possible for one or more detent elements to be embodied as displaceable, each in respective bearing points, counter to at least one spring element each, or counter to a common spring element.

It is also proposed that the slaving device has at least one fastening element, extending in the axial direction, which can be passed through at least one region of an elongated slot of the circular saw blade and in the elongated slot is displaceable in a narrower region of the elongated slot, and by way of which the circular saw blade is axially fixable in the elongated slot via a contact face disposed on the fastening element. The tool hub can advantageously be embodied economically and essentially flat and can be used as a spring element, for instance elastically deforming the tool hub upon displacement of the component in the elongated slot. The tool hub can furthermore be used to deflect a component counter to a spring element in the axial direction. Additional components and installation effort and expense can be saved as a result.

To make a long spring travel of the hub possible, advantageously a component forming a bearing face for the circular saw blade, in the fastened state of the circular saw blade, has a recess in the region of the elongated slot, into which recess part of the circular saw blade is pressed elastically, in an operating position of the circular saw blade.

If the fastening element extending in the axial direction is supported elastically displaceably in the axial direction counter to a spring element, for axially fixing the circular saw blade, on the one hand an advantageously long spring travel can be attained independently of the tool hub, and on the other, the component and the spring element can be designed in a targeted way for their separate functions. However, the fastening element can also be embodied at least in part integrally with a spring element. If a plurality of axially extending components are provided for the axial fixation, then they can each be loaded via a respective spring element or advantageously via one common spring element, so that additional components, installation effort, weight and expense can all be saved.

To achieve an advantageous centering and low-vibration running of the circular saw blade, a collar, by way of which the circular saw blade can be radially centered, is preferably formed onto a component of the slaving device that forms a bearing face for the circular saw blade. A self-contained centering face can simply be formed. Forces on the circular saw blade in the radial direction can advantageously be absorbed by positive engagement, an example being forces in the radial direction when some item is severed. Forces can be prevented from acting radially on components that are axially displaceable, thus preventing consequent damage or wear to these components. In addition, a radial play of the insert tool is reliably avoided, so that better concentricity is attainable. Instead of a collar, an indentation which the tool hub in the secured state engages with a protrusion is also fundamentally conceivable.

The circular saw blade and its tool hub can be produced by various methods that appear useful to one skilled in the art. Especially advantageously, however, in one production operation, especially a laser-cutting process, for producing an outer contour of the circular saw blade, at least one recess for the machine tool receptacle can be made in the circular saw blade or the tool hub, making economy of production time and expense possible. Furthermore, it is possible to produce the circular saw blade with its tool hub in a stamping operation.

If at least one detent element is integrally formed onto a disklike component and/or if at least two elements for fixing the circular saw blade in the axial direction are integrally formed onto a disklike component, then additional components, assembly effort and expense can be saved. Moreover, pressed connections between individual components and the resultant leak points can be avoided.

BRIEF DESCRIPTION OF THE DRAWINGS

FIG. 10, a slaving element of FIG. 5 from a side remote from the circular power saw;

FIG. 11, the slaving element of FIG. 10 from the side;

FIG. 12, a section taken along the line XII—XII of FIG. 10;

DESCRIPTION OF THE PREFERRED EMBODIMENTS

Figure 1:
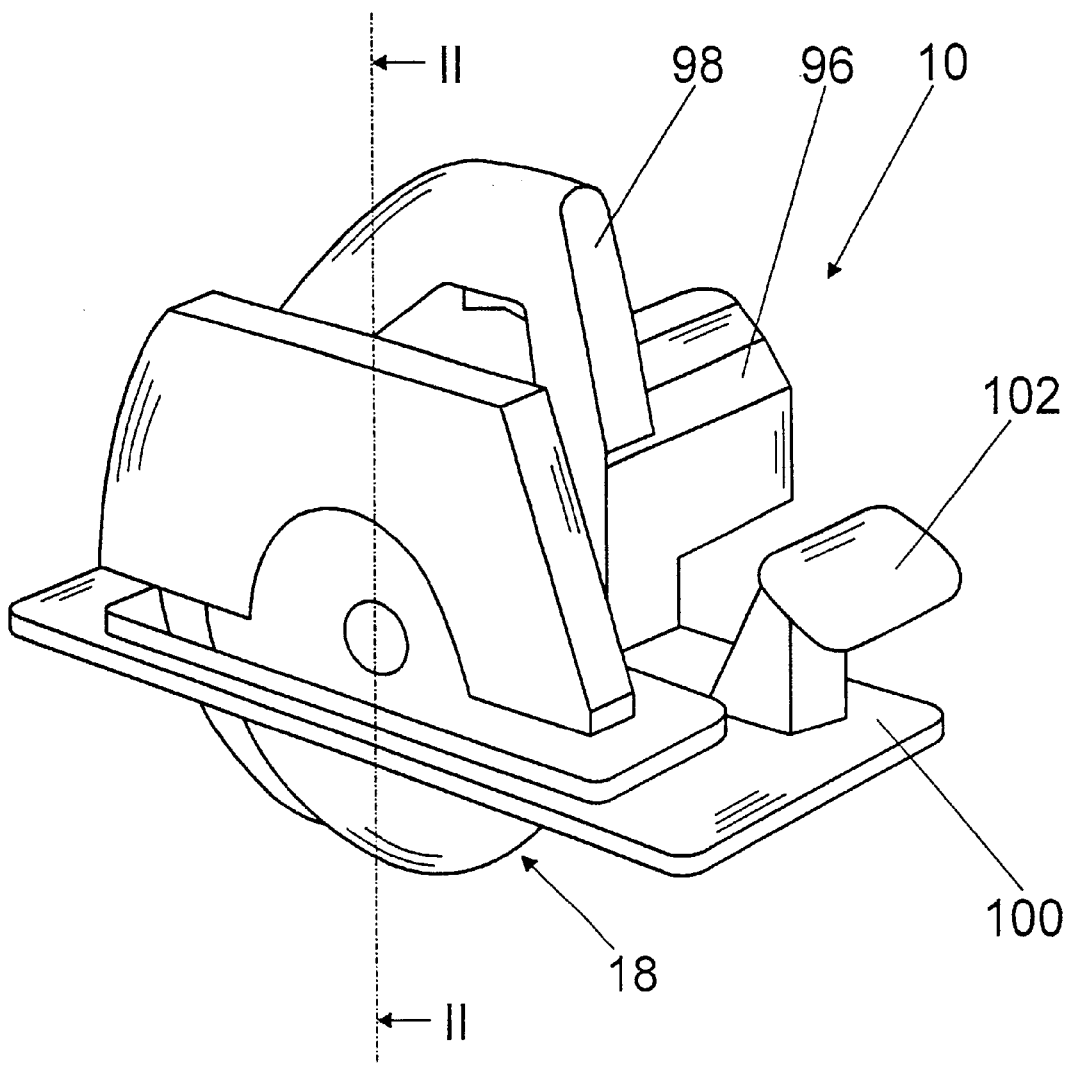
FIG. 1, a circular power saw obliquely from above.

FIG. 1 shows a circular saw 10 obliquely from above, with an electric motor, not shown, supported in a housing 96. The circular power saw 10 can be guided via a first handle 98, integrated with the housing 96, and a second handle 102, secured to a guard baffle 100.

Figure 2:
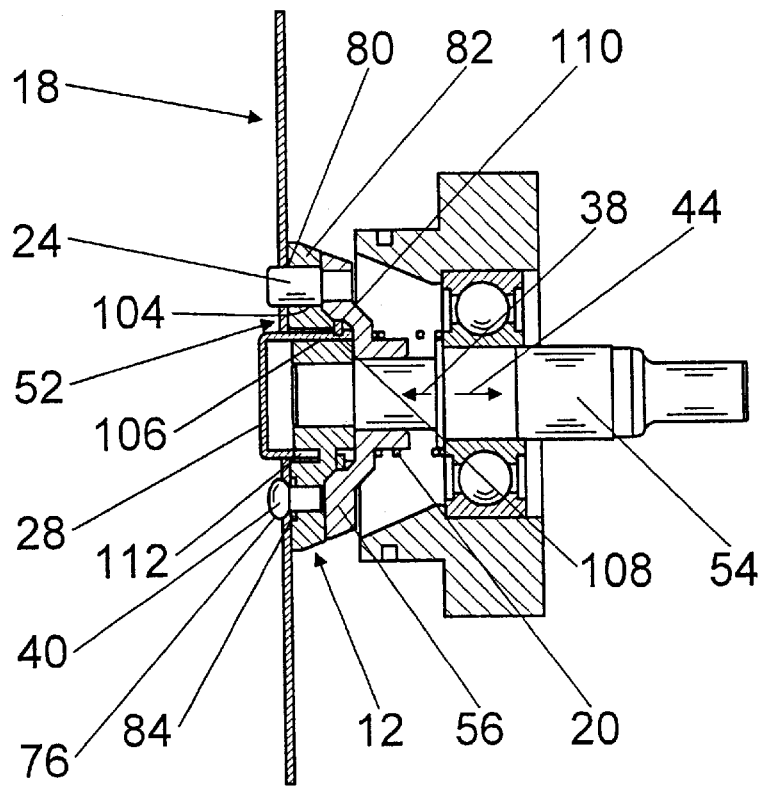
FIG. 2, a schematic cross section taken along the line II—II of FIG. 1 through a machine tool receptacle of the invention.

With the electric motor, via a gear not shown, a drive shaft 54 can be driven, on whose end pointing toward the circular saw blade 18 a slaving device 12 is disposed (FIG. 2). The slaving device 12, on a side toward the circular saw blade 18, has a slaving flange 82 pressed firmly onto the drive shaft 54, and on a side remote from the circular saw blade 18, it has a slaving disk 56 that is supported dlsplaceably on the drive shaft 54 axially counter to a centrally disposed helical spring 20.

In the slaving flange 82, three pins 40 disposed at uniform intervals one after the other in the circumferential direction 34, 36 and extending in the axial direction 38 to the circular saw blade 18 past the slaving flange 82 are press-fitted into the slaving flange 82. On their end pointing toward the circular saw blade 18, the pins 40 each have one head, which has a larger diameter than a remainder of the pin 40, and on a side toward the slaving flange 82, this head has a transmission face 76 that narrows in the axial direction 44. The slaving flange 82 forms an axial bearing face 80 for the circular saw blade 18, which face defines an axial position of the circular saw blade 18; recesses 84 are made in this face in the region of the pins 40. Three axial through bores 104 are also made in the slaving flange 82 one after the other in the circumferential direction 34, 36; specifically, one through bore 104 is disposed between each two pins 40 in the circumferential direction 34, 36.

Three bolts 24 are press-fitted one after the other in the circumferential direction 34, 36 into the slaving disk 56 that is supported axially displaceably on the drive shaft 54; these bolts extend in the axial direction 38 to the circular saw blade 18 via the slaving disk 56. The slaving disk 56 is pressed by the helical spring 20 in the direction 38 toward the circular saw blade 18 against the slaving flange 82. The bolts 24 protrude through the through bores 104 and extend in the axial direction 38 past the slaving flange 82.

The slaving device 12 also has a cup-shaped unlocking button 28, disposed centrally on the side toward the circular saw blade 18. The unlocking button 28 has three segments 106, distributed uniformly in the circumferential direction 34, 36 and extending in the axial direction 44 to the axially movably supported slaving disk 56, which segments reach through corresponding recesses 108 in the slaving flange 82 and are secured against falling out in the axial direction 38 via a snap ring 110 with the slaving disk 56. The unlocking button 28 is guided displaceably in the axial direction 38, 44 in an annular recess 112 in the slaving flange 82.

The circular saw blade 18 has a tool hub 52, which is embodied integrally with the circular saw blade 18. In principle, a tool hub that is connected to the circular saw blade via a nonpositive, positive and/or material engagement would also be conceivable. The tool hubs can then be made from some material, independent of the circular saw blade itself, that seems useful to one skilled in the art, such as a special plastic. The tool hub 52, in the circumferential direction 34, 36, has three uniformly distributed bores 46, 48, 50, whose diameter is slightly greater than the diameter of the bolts 24. The tool hub 52 also has three elongated slots 64, 66, 68, extending in the circumferential direction 34, 36 and distributed uniformly in the circumferential direction 34, 36, each having a respective narrow region 70, 72, 74 and a respective wide region 58, 60, 62 that is produced by means of a bore, and whose diameter is slightly greater than the diameter of the heads of the pins 40.

The tool hub 52 has a centering bore 116, whose diameter is advantageously selected such that the circular saw blade 18 can be clamped on a conventional circular power saw with a conventional chucking system that has one or two chucking flanges and a clamping screw or tightening nut. This assures so-called downward compatibility.

Upon installation of the circular saw blade 18, the circular saw blade 18 is slipped with its centering born 116 onto the unlocking button 28 and centered radially. Next, the circular saw blade 18 is rotated, until the pins 40 engage the wide regions 58, 60, 62, intended for them, in the elongated slots 64, 66, 68 of the tool hub 52. Pressing the tool hub 52 against the bearing face 80 of the slaving flange 82 has the effect that the bolts 24 in the through bores 104 and also the slaving disk 56 are displaced counter to a spring force of the helical spring 20 axially on the drive shaft 54 in the direction 44 remote from the circular saw blade.

Further rotation of the tool hub 52 counter to the drive direction 34 has the effect that the pins 40 are displaced into the curved, narrow regions 70, 72, 74 of the elongated slots 64, 66, 68. In the process, with their conical contact faces 76, the pins 40 press against the edges of the elongated slots 64, 66, 68 and press them elastically into the recesses 84 of the slaving flange 82. As a result, the tool hub 52 is pressed against the bearing face 80 and is fixed in the axial direction 38, 44.

In a terminal position, or in an operating position of the circular saw blade 18 that is attained, the bores 46, 48, 50 in the tool hub 52 come to rest above the through bores 104 of the slaving flange 82. By the spring force of the helical spring 20, the bolts 24 are axially displaced in the direction 38 of the circular saw blade 18 and snap into the bores 46, 48, 50 of the tool hub 52 and fix the tool hub by positive engagement in both circumferential directions 34, 36. Upon snapping into place, a snapping noise that is audible to a user occurs, indicating operating readiness to the user.

A driving moment of the electric motor of the circular power saw 10 can be transmitted by the drive shaft 54 to the slaving flange 82 by nonpositive engagement and by the slaving flange 82 to the circular saw blade 18 via the bolts 24 by positive engagement. The drive moment is transmitted solely via the bolts 24, since the elongated slots 64, 66, 68 are designed such that when the bolts 24 have snapped into place, the pins 40 do not come to rest on the end of the narrow regions 70, 72, 74 of the elongated slots 64, 66, 68.

In addition, a braking moment that occurs when the electric motor is switched off and thereafter and which is oriented counter to the driving moment can be transmitted by positive engagement from the slaving flange 82 to the circular saw blade 18 via the bolts 24. Unintended loosening of the circular saw blade 18 is reliably avoided. By means of the three bolts 24 uniformly distributed in the circumferential direction 34, 36, an advantageous uniform distribution of both force and mass is attained.

To release the circular saw blade 18 from the circular power saw 10, the unlocking button 28 is pressed. The slaving disk 56 is displaced with the bolts 24 via the unlocking button 28, counter to the helical spring 20, in the axial direction 44 remote from the circular saw blade 18, and as a result the bolts 24 move in the axial direction 44 out of their detent position, that is, out of the bores 46, 48, 50 of the tool hub 52. Next, the circular saw blade 18 is rotated in the driving direction 34, specifically until the pins 40 come to rest in the wide regions 58, 60, 62 of the elongated slots 64, 66, 68, and the circular saw blade 18 can be removed from the slaving flange 82 in the axial direction 38. Once the unlocking button 28 is let go, the slaving disk 56, bolts 24 and unlocking button 28 are displaced backward into their outset positions by the helical spring 20.

Figure 3:
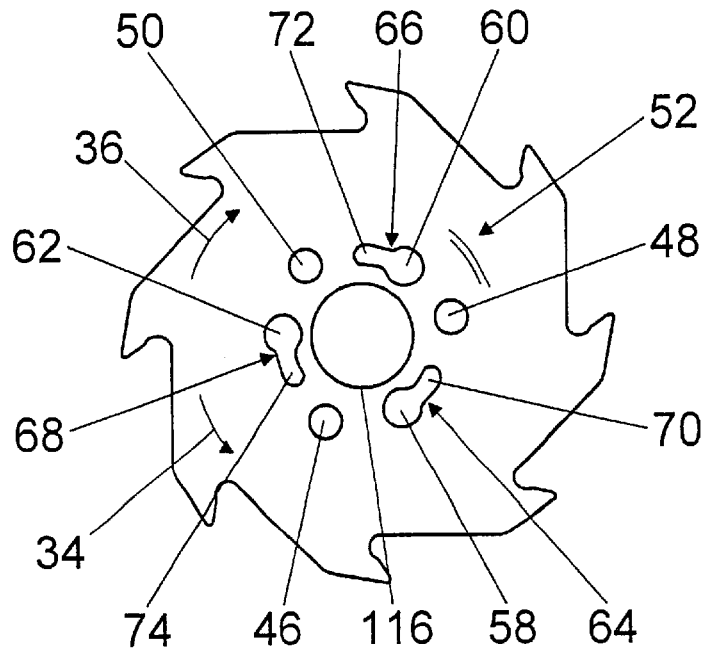
FIG. 3, a tool hub seen from a side remote from the circular power saw.
Figure 4:
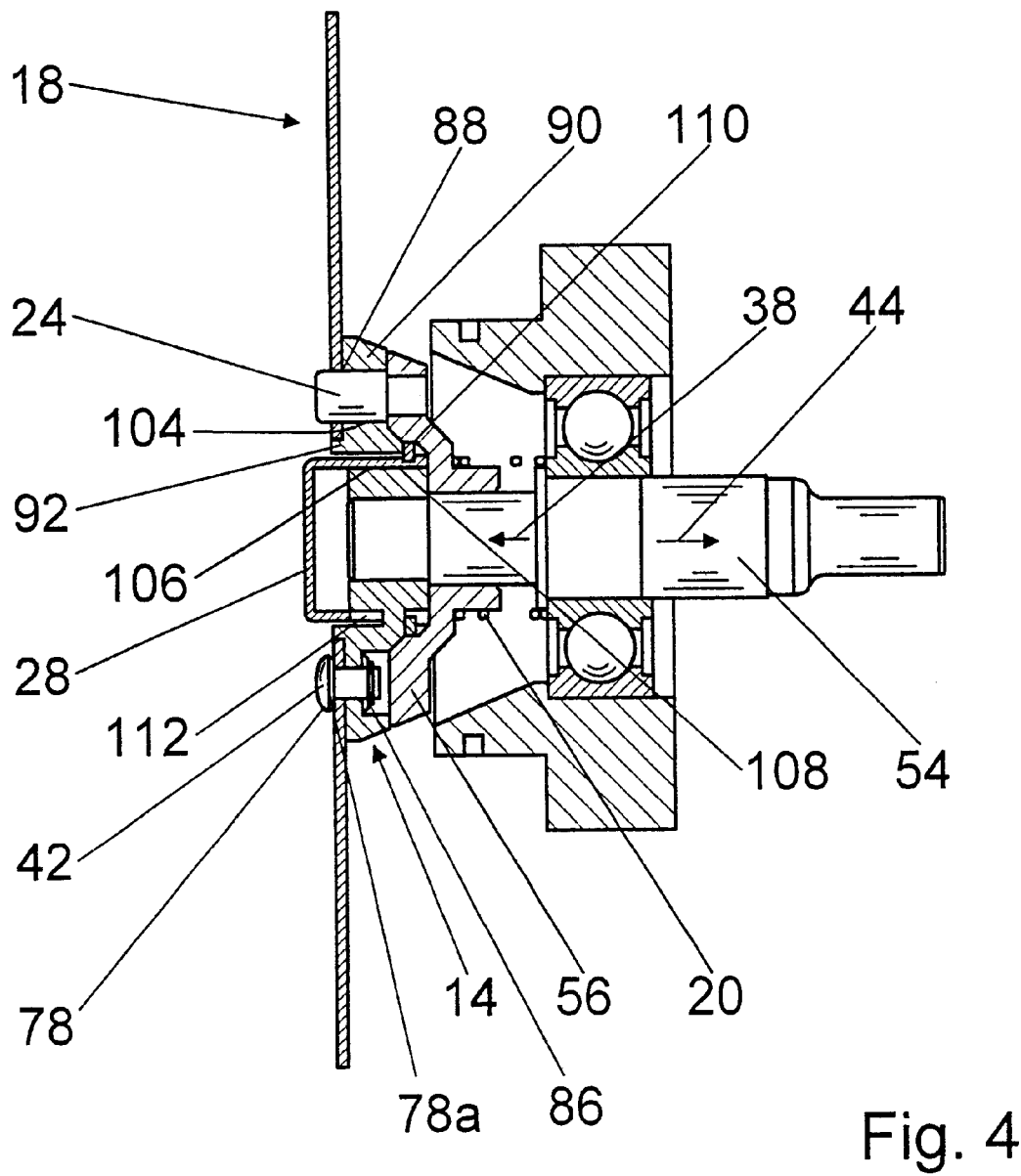
FIG. 4, a variant of FIG. 2.

In FIG. 4, an alternative exemplary embodiment to the exemplary embodiment of FIG. 2 is shown, with a slaving device 14. Components that remain essentially the same are identified by the same reference numerals in the exemplary embodiments shown. Also, the description of the exemplary embodiment in FIGS. 2 and 3 can be referred to for characteristics and functions that remain the same.

The slaving device 14 has a slaving flange 90 pressed onto the drive shaft 54. A collar 92 is formed onto the slaving flange 90, which forms a bearing face 88 for the circular saw blade 18; by way of this collar, the circular saw blade 18 is radially centered in the state in which it is mounted with its centering bore 116. Radial forces can advantageously be absorbed by the slaving flange 90 without puffing a load on the unlocking button 28.

Also in the slaving flange 90, three pins 42 distributed uniformly in the circumferential direction 34, 36 and extending in the axial direction 38 past the bearing face 88 are supported displaceably in the axial direction 38, each against a respective cup spring 86, for the sake of axial fixation of the circular saw blade 18. Each of the pins 42, on its end pointing toward the circular saw blade 18, has a head, which has a larger diameter than a remaining portion of the pin 42, and on a side toward the slaving flange 90, the pins have a conical contact face 78, which tapers in the axial direction 44, and a contact face 78a extending parallel to the bearing face 78. If the heads of the pins 42 are guided by the wide regions 58, 60, 52 of the elongated slots 64, 66, 68, then a rotation of the tool hub 52 counter to the driving direction 34 causes the pins 42 to be displaced into the curved narrow regions 70, 72, 74 of the elongated slots 64, 66, 68. In the process, the pins 42 are displaced axially in the direction 38, counter to the pressure of the cup springs 86, via the conical contact faces 78 until the contact faces 78a of the pins 40 cover the edges of the elongated slots 64, 66, 68 in the curved narrow regions 70, 72, 74.

In the installed state, the cup springs 86, via the contact faces 78 of the pins 42, press the circular saw blade 18 against the bearing face 78a. Instead of being loaded with a plurality of cup springs 86, the pins can also be loaded via other spring elements that appear useful to one skilled in the art, such as one cup spring, not shown, with its centering bore is radially centered in the installed state. Radial forces can advantageously be absorbed by the slaving flange 90, without putting a load on an unlocking button 28.

In FIGS. 5–12, one further exemplary embodiment with a slaving device 16 is shown. The slaving device 16 has a slaving flange 118 (FIG. 5; FIGS. 10, 11 and 12) secured via a thread 120 to a drive shaft not identified by reference numeral. The slaving flange could also be joined to the drive shaft via an inseparable connection or integrally embodied with it.

The slaving flange 118 has three segments 122, 124, 126, distributed uniformly in the circumferential direction 34, 36 and extending in the axial direction 38 toward a circular saw blade 32, and between the segments it has interstices 128, 130, 132 (FIG. 10). Each of these segments 122, 124, 126 has a groove 134, 136, 138 on its circumference; these grooves are closed counter to the drive direction 34, each via a respective rotation stop 140, 142, 144, and are open in the drive direction 34. The slaving flange 118 furthermore has a bearing face 114, which defines an axial position of the circular saw blade 32. The segments 122, 124, 126 furthermore form a centering collar for the circular saw blade 32, by way of which the circular saw blade 32 can be centered.

Figure 5:
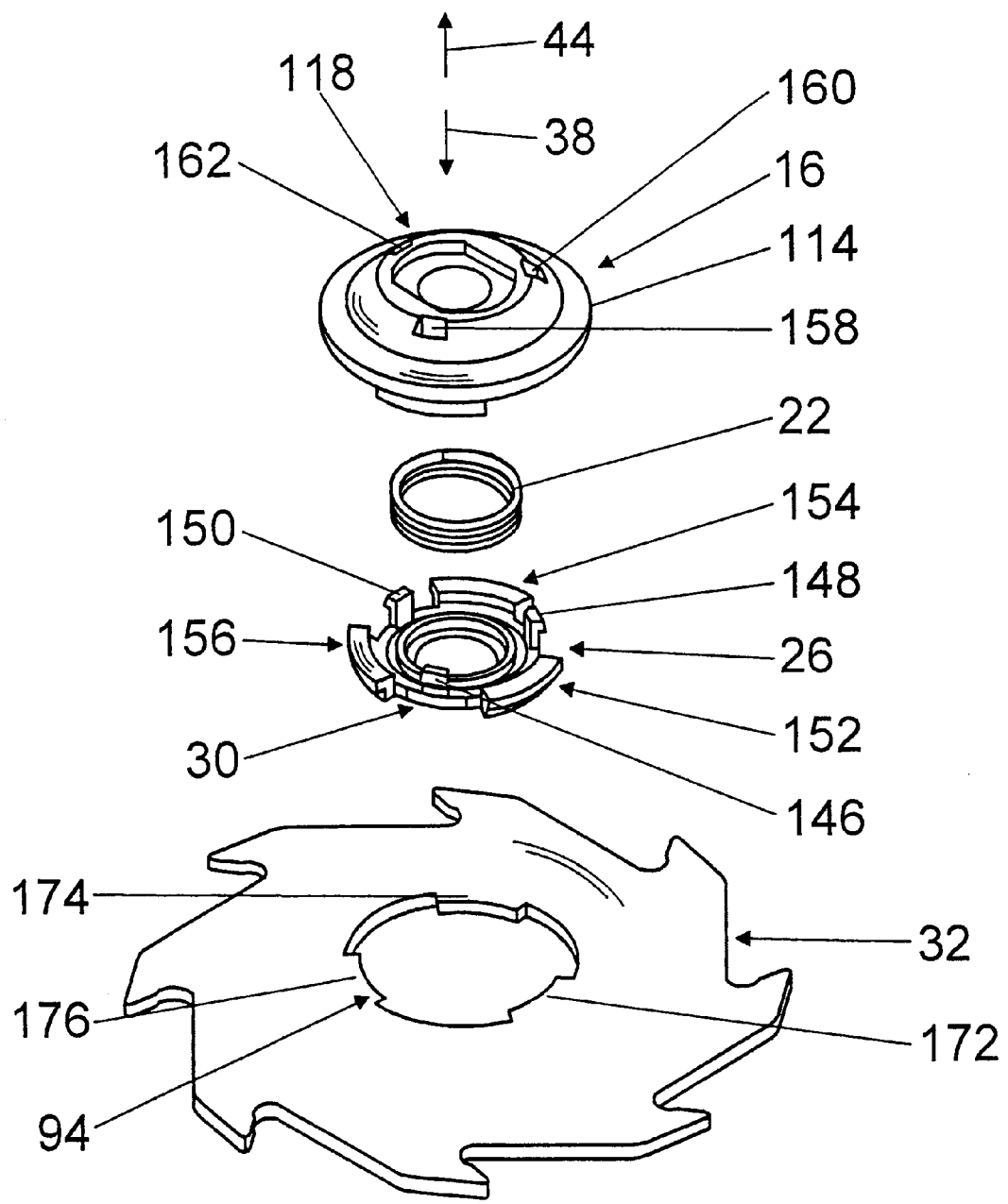
FIG. 5, an exploded view of a variant of FIG. 4.
Figure 8:
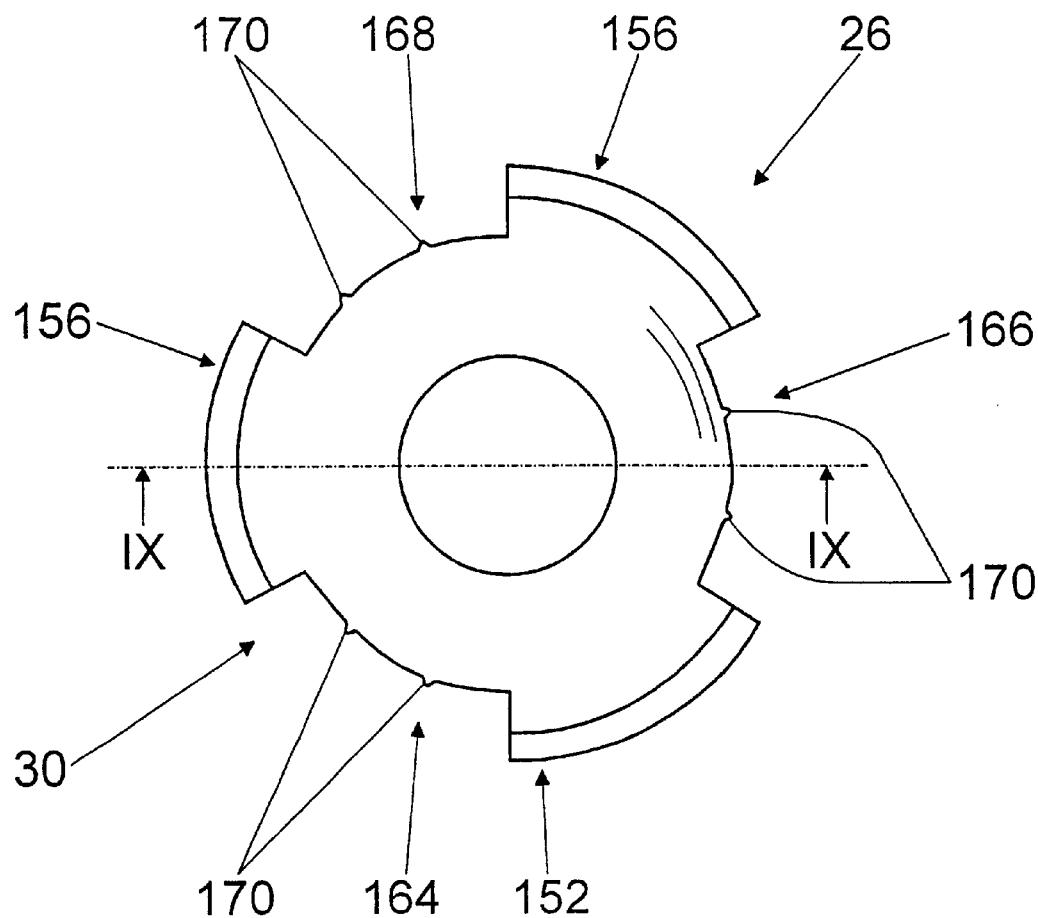
FIG. 8, an unlocking button of FIG. 5 from a side remote from the circular power saw.
Figure 9:
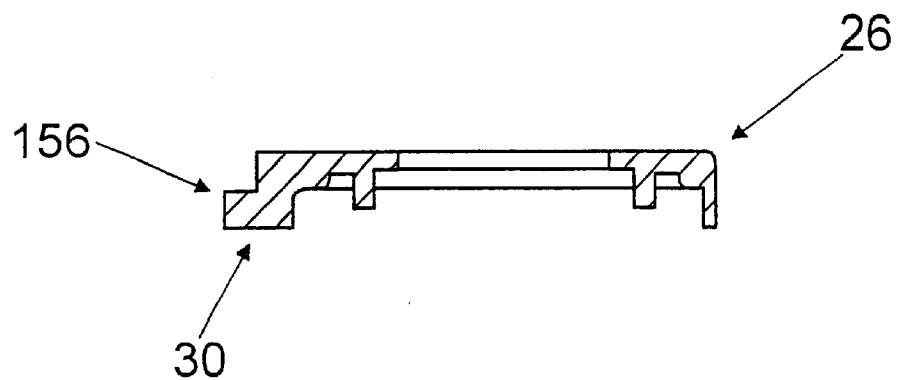
FIG. 9, a section taken along the line IX—IX of FIG. 8.

In the installed state, a detent element 26 is connected to the slaving flange 118 via three detent pegs 146, 148, 150 distributed in the circumferential direction 34, 36, which reach through corresponding recesses 158, 160, 162 of the slaving flange 118 and radially outward engage the slaving flange 118 from behind (FIGS. 5, 8 and 9). On the detent element 26, which at the same time forms an unlocking button 30, three radially outward-extending blocking segments 152, 154, 156 are formed on, distributed uniformly in the circumferential direction 34, 36. Between the slaving flange 118 and the detent element 26 is a helical compression spring 22, against which the detent element 26 is displaceable, in the axial direction 44 remote from the circular saw blade 32, relative to the slaving flange 118. Via radially outward-pointing bearing faces 164, 166, 168 between the blocking segments 152, 154, 156, the detent element 26 is guided in radially inward-pointing faces of the segments 122, 124, 126 of the slaving flange 118. To prevent canting of the detent element 26 and to attain small bearing faces 164, 166, 168, the bearing faces 164, 166, 168 are formed by radially outward-extending protrusions 170 (FIG. 8).

In the installed state, the blocking segments 152, 154, 156 are located in the interstices 128, 130, 132 of the slaving flange 118 and protrude radially past a groove bottom of the grooves 134, 136, 138. In an outset position, before the circular saw blade 32 is installed, the blocking segments 152, 154, 156 of the detent element 26 are located in front of the grooves 134, 136, 138, and specifically are loaded by the prestressed helical compression spring 22.

Figure 6:
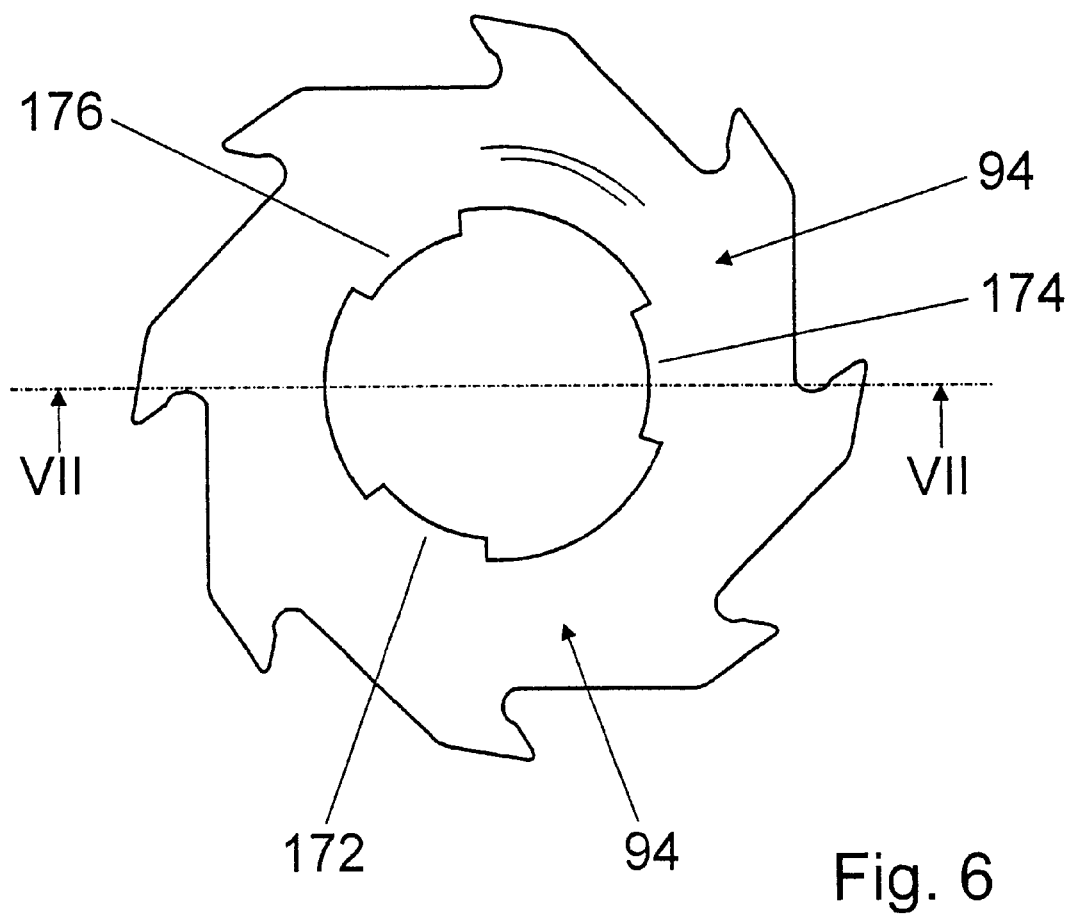
FIG. 6, a tool hub of FIG. 5 from a side remote from the circular power saw.
Figure 7:
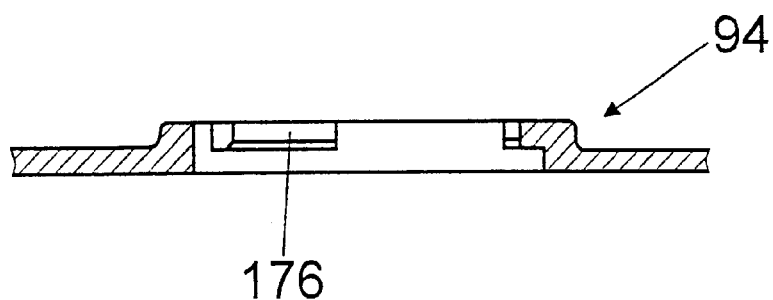
FIG. 7, a section taken along the line VII—VII of FIG. 6.

A tool hub 94 is integrally formed onto the circular saw blade 32; on its inner diameter it has radially inward-pointing tongues or spring elements 172, 174, 176 for a tongue-and-groove connection (FIGS. 5, 6 and 7). In conjunction with the slaving flange 118 and the unlocking button 30, the spring elements 172, 174, 176 serve to transmit the drive moment, to position the circular saw blade 32 axially, and to secure the circular saw blade 32 against running off center when the electric motor is turned off or the drive shaft is braked. In addition, along with the segments 122, 124, 126, the spring elements can be used for centering the circular saw blade 32 relative to the drive shaft.

In the installation of the circular saw blade 32, the circular saw blade is aligned with the slaving flange 118, so that the spring elements 172, 174, 176 on the inner diameter of the tool hub 94 point into the interstices 128, 130, 132 between the segments 122, 124, 126 of the slaving flange 118. The spring elements 172, 174, 176 of the circular saw blade 32 rest on the blocking segments 152, 154, 156 of the unlocking button 30. Next, the circular saw blade 32 is pressed in the axial direction 44 until it reaches the bearing face 114 of the slaving flange 118. The spring elements 172, 174, 176 displace the unlocking button 30, with its blocking segments 152, 154, 156, in the direction 44 axially remote from the circular saw blade 32, counter to the spring force of the helical compression spring 22. The blocking segments 152, 154, 156 are pressed into recesses 178 of the slaving flange 118 (FIG. 12), so that the spring elements 172, 174, 176 come to rest in front of the grooves 134, 136, 138.

In the process, the circular saw blade 32 is radially centered via the centering collar formed by the segments 122, 124, 126. By rotation of the circular saw blade 32 counter to the drive direction 34, the spring elements 172, 174, 176 engage the grooves 134, 136, 138 of the slaving flange 118. A tongue-and-groove connection is made. The spring elements 172, 174, 176 have the same length in the circumferential direction 36 as the grooves 134, 136, 138. Once the spring elements 172, 174, 176 have been thrust all the way into the grooves 134, 136, 138, that is, once an operating position of the circular saw blade 32 is reached, the detent element 26 with its blocking segments 152, 154, 156 snaps into place, and the helical compression spring 22 presses the detent element 26 with its blocking segments 152, 154, 156 into its outset position, so that once again the blocking segments 152, 154, 156 come to rest in front of the grooves 134, 136, 138. With its blocking segments 152, 154, 156, the detent element 26 fixes the circular saw blade 32 by positive engagement counter to the drive direction 34. The process of snapping into place creates a snap-in noise that is audible to a user and indicates to the user that the snap-in process has been completed as desired, and the system is ready for operation.

The transmission of the drive moment to the spring elements 172, 174, 176 of the tool hub 94 or circular saw blade 32 is done by positive engagement via the rotation stops 140, 142, 144 of the slaving flange 118. The circular saw blade 32 is centered via the centering collar formed by the segments 122, 124, 126 of the slaving flange 118 and is held in its axial position by the bearing face 114 and the grooves 134, 136, 138. In addition, a braking moment, oriented counter to the drive moment and occurring upon and after the shutoff of the electric motor, is transmitted by positive engagement from the blocking segments 152, 154, 156 and the slaving flange 118 to the spring elements 172, 174, 176 of the circular saw blade 32.

An equalization of play is achieved in the axial direction by means of a spring element, not identified by reference numeral but formed by a tool strip, in the grooves 134, 136, 138. An equalization of play could also be attained via other spring elements appearing useful to one skilled in the art, such as spring-loaded balls that are placed at suitable points of the slaving flange and that fix the tool hub of the circular saw blade without play, and/or with a slight oversize of the spring elements of the tool hub, by means of a slightly wedgelike shape of the grooves and the spring elements of the tool hub, and so forth.

For releasing the circular saw blade 32, the unlocking button 30 is pressed in the axial direction 44 remote from the circular saw blade 32. The blocking segments 152, 154, 156 of the unlocking button 30 and of the detent element 26 are displaced into the recesses 178 of the slaving flange 118.

Next, with its spring elements 172, 174, 176, the circular saw blade 32 can be rotated in the drive direction 34 out of the grooves 134, 136, 138 of the slaving flange 118 and pulled off in the axial direction 38. As the circular saw blade 32 is pulled off, the unlocking button 30 is compressed into its outset position by the helical compression spring 22.

Figure 13:
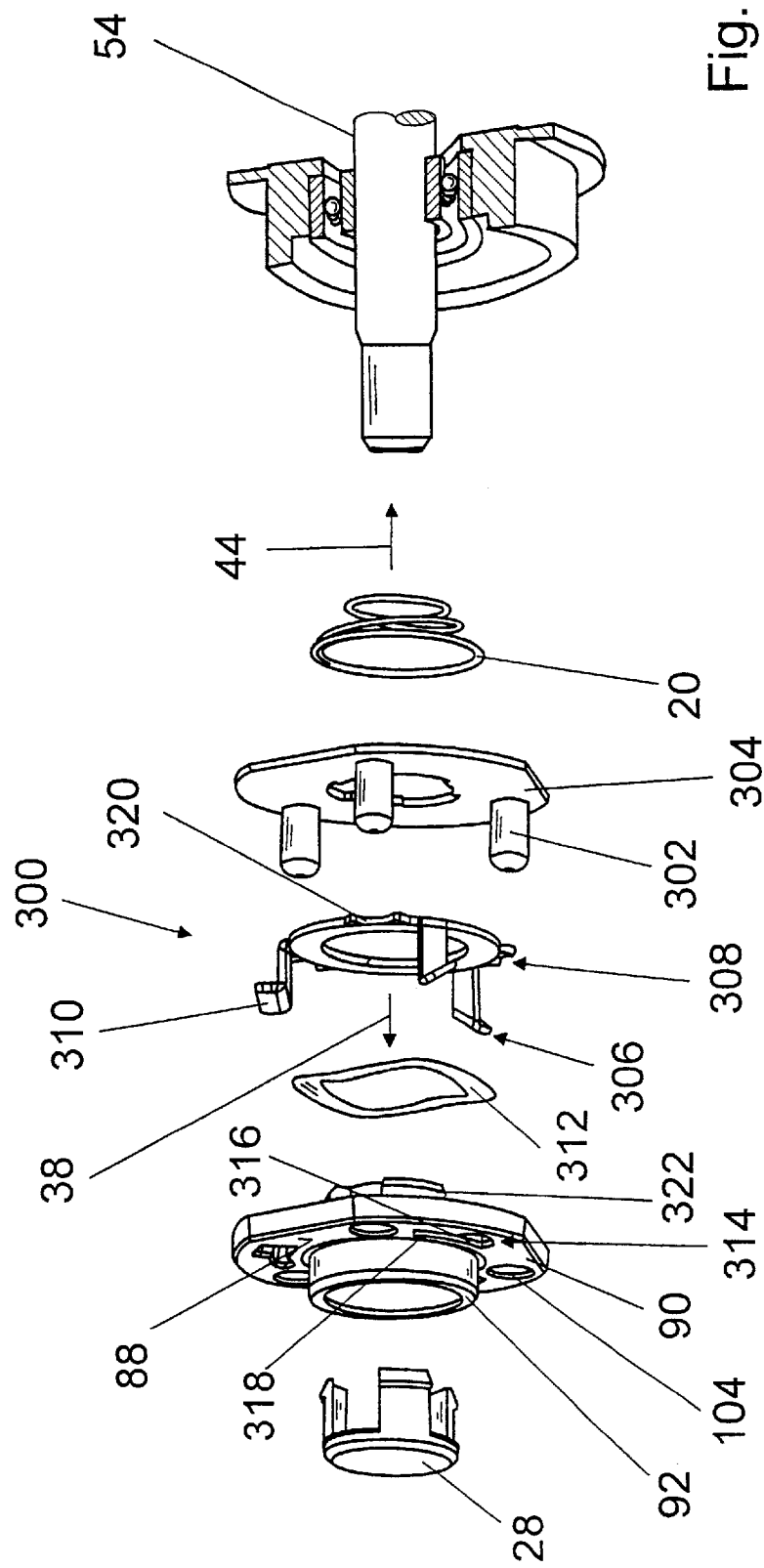
FIG. 13, an exploded view of a variant of FIG. 4.

In FIG. 13, an alternative exemplary embodiment to the exemplary embodiment of FIG. 4 is shown, with a slaving device 300. The slaving device 300 has a slaving flange 90, which forms a bearing face 88 for a circular saw blade, not identified by reference numeral here. On the side toward the circular saw blade, a collar 92 is formed onto the slaving flange 90, and by way of this collar the circular saw blade with its centering bore is radially centered in the installed state. Radial forces can advantageously be absorbed by the slaving flange 90, without putting a load on an unlocking button 28.

On a side of the slaving flange 90 remote from the circular saw blade, a tool plate 308 for axial fixation of the circular saw blade is disposed, having three circumferentially uniformly distributed, integrally formed-on fastening elements 306 that extend in the axial direction 38. The fastening elements 306 are formed onto the tool plate 308 in a bending operation.

Figure 15:
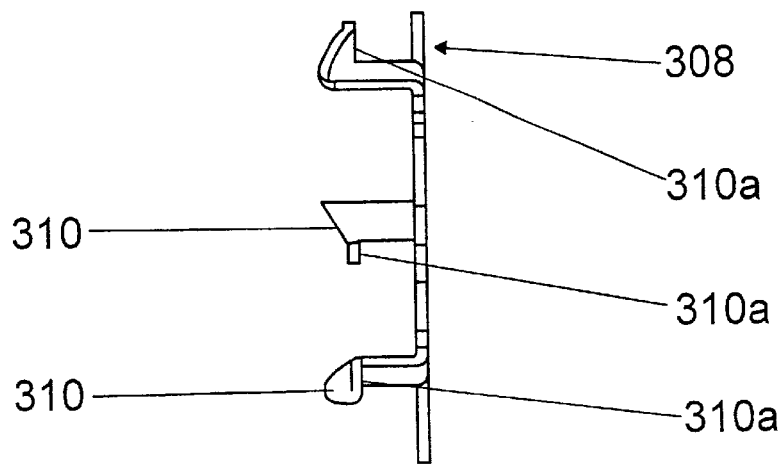
FIG. 15, a side view of a sheet-metal plate of FIG. 13.
Figure 16:
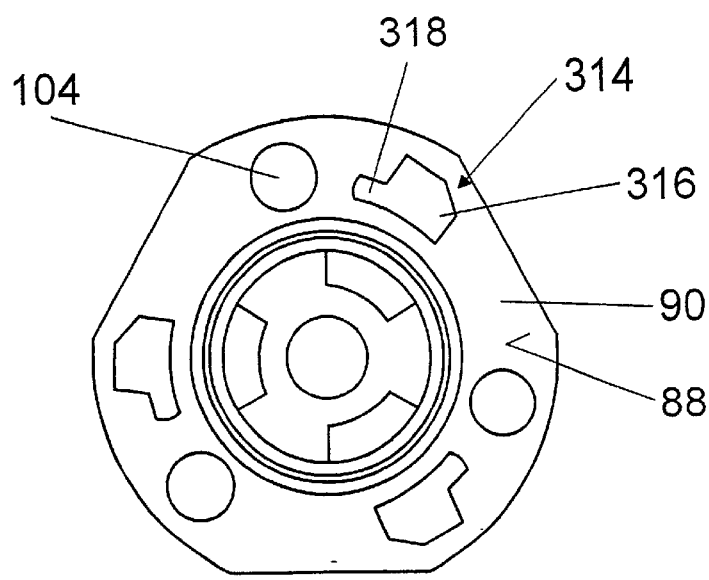
FIG. 16, a slaving flange from FIG. 13, seen from below.

Upon installation, the slaving flange 90, a wave washer 312 and the tool plate 308 are pre-installed. In the process, the wave washer 312 is slipped onto a collar 322, pointing in the direction away from the circular saw blade, of the slaving flange 90. Next, the fastening elements 306 of the tool plate 308, which on their free end have a hook-shaped extension with an oblique face 310 pointing in the circumferential direction (FIGS. 13 and 15), are guided in the axial direction 38 by recesses 314 of the slaving flange 90, specifically by widened regions 316 of the recesses 314 (FIGS. 13 and 15). By compression and rotation of the tool plate 308 and slaving flange 90 against one another, the wave washer 312 is pre-stressed, and the tool plate 308 and the slaving flange 90 are connected by positive engagement in the axial direction 38, 44, specifically in that the hook-shaped extensions are rotated into narrow regions 318 of the recesses 314 (FIGS. 13, 15 and 16). Next, loaded by the wave washer 312, the tool plate 308 is braced on the bearing face 88 of the slaving flange 90 via edges 310a of the hook-shaped extensions, which point axially in the direction away from the circular saw blade.

Figure 14:
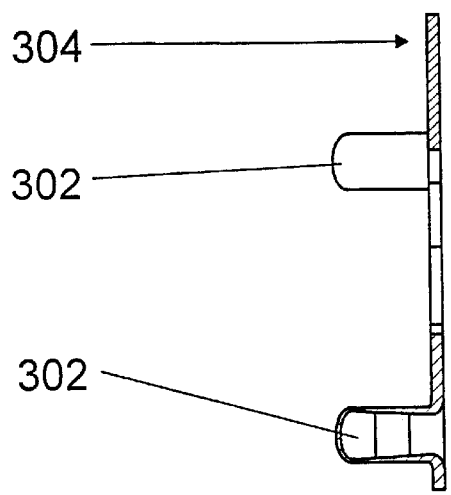
FIG. 14, a section through a slaving disk of FIG. 13 with a bolt formed onto it.

Once the tool plate 308 with the formed-on fastening elements 306, the wave washer 312 and the slaving flange 90 have been pre-installed, a compression spring 20 and a slaving disk 304, with three circumferentially uniformly distributed, integrally formed-on bolts 302 extending in the axial direction 38, are slipped onto a drive shaft 54. The bolts 302 are formed onto a tool plate forming the slaving disk 304 in a deep-drawing operation (FIG. 14).

Next, the pre-installed group of components, comprising the tool plate 308, wave washer 312 and slaving flange 90, are mounted on the drive shaft 54. In this operation, the bolts 302 are guided by recesses 320 formed onto the circumference of the tool plate 308 and by through bores 104 in the slaving flange 90, and in the installed state they reach through the through bores 104. The sheet-metal plate 308 and the slaving flange 90 are secured against rotating relative to one another via the bolts 302.

The slaving flange 90 is pressed onto the drive shaft 54 and then secured with a securing ring, not shown in detail. Instead of a press-fitted connection, however, other connections that appear useful to one skilled in the art are also conceivable, such as a threaded connection, and so forth.

Once in the installation of a circular saw blade 18 (see FIGS. 3 and 4) the hook-shaped extensions of the fastening elements 306 are guided through the wide regions 58, 60, 62 of the elongated slots 64, 66, 68 of the tool hub 52 (FIG. 13), rotating the sheet-metal hub 52 counter to the driving direction 34 has the effect of displacing the hook-shaped extensions into the curved, narrow regions 70, 72, 74 of the elongated slots 64, 66, 68 of the tool hub 52. In the process, the tool plate 308 with the fastening elements 306 is displaced axially in the direction 38 via the oblique faces 310 counter to the pressure of the wave washer 312, until the edges 310a of the hook-shaped extensions come to rest in curved, narrow regions 70, 72, 74 laterally next to the elongated slots 64, 66, 68 of the tool hub 53. In the installed state, the wave washer 312, via the edges 310a of the hook-shaped extensions, presses the circular saw blade 18 against the bearing face 88.

Alternatively, the fastening elements and elongated slots in the tool hub could be embodied as rotated by 180°, reversing the direction of installation, and the sheet-metal hubs would be rotated in the driving direction upon assembly. If the fastening elements are embodied as rotated by 180°, then in operation an oblique face of a lower face-end edge of the fastening element is in the lead, so that injuries from the face-end edge can be prevented.

List of Reference Numerals

| Number | Description |
|---|---|
| 10 | Circular power saw |
| 12 | Slaving device |
| 14 | Slaving device |
| 16 | Slaving device |
| 18 | Circular saw blade |
| 20 | Spring element |
| 22 | Spring element |
| 24 | Detent element |
| 26 | Detent element |
| 28 | Unlocking button |
| 30 | Unlocking button |
| 32 | Circular saw blade |
| 34 | Circumferential direction |
| 36 | Circumferential direction |
| 38 | Direction |
| 40 | Fastening element |
| 42 | Fastening element |
| 44 | Direction |
| 46 | Recess |
| 48 | Recess |
| 50 | Recess |
| 52 | Tool hub |
| 54 | Drive shaft |
| 56 | Component |
| 58 | Region |
| 60 | Region |
| 62 | Region |
| 64 | Elongated slot |
| 66 | Elongated slot |
| 68 | Elongated slot |
| 70 | Region |
| 72 | Region |
| 74 | Region |
| 76 | Contact face |
| 78 | Contact face |
| 80 | Bearing face |
| 82 | Component |
| 84 | Recess |
| 86 | Spring element |
| 88 | Bearing face |
| 90 | component |
| 92 | Collar |
| 94 | Tool hub |
| 96 | Housing |
| 98 | Handle |

-continued
List of Reference Numerals

| Number | Description |
|---|---|
| 100 | Guard baffle |
| 102 | Handle |
| 104 | Through bore |
| 106 | Segment |
| 108 | Recess |
| 110 | Snap ring |
| 112 | Recess |
| 114 | Bearing face |
| 116 | Centering bore |
| 118 | Slaving flange |
| 120 | Thread |
| 122 | Segment |
| 124 | Segment |
| 126 | Segment |
| 128 | Interstice |
| 130 | Interstice |
| 132 | Interstice |
| 134 | Groove |
| 136 | Groove |
| 138 | Groove |
| 140 | Rotation stop |
| 142 | Rotation stop |
| 144 | Rotation stop |
| 146 | Detent peg |
| 148 | Detent peg |
| 150 | Detent peg |
| 152 | Blocking segment |
| 154 | Blocking segment |
| 156 | Blocking segment |
| 158 | Recess |
| 160 | Recess |
| 162 | Recess |
| 164 | Bearing face |
| 166 | Bearing face |
| 168 | Bearing face |
| 170 | Protrusion |
| 172 | Spring elements |
| 174 | Spring elements |
| 176 | Spring elements |
| 178 | Recess |
| 300 | Slaving device |
| 302 | Detent element |
| 304 | component |
| 306 | Element |
| 308 | Component |
| 310 | Oblique face |
| 310a | Edge |
| 312 | Spring element |
| 314 | Recess |
| 316 | Region |
| 318 | Region |
| 320 | Recess |
| 322 | Collar |

What is claimed is:

1. A machine tool receptacle, having a slaving device (12, 14, 16, 300), by way of which an insert tool can be operatively connected to a drive shaft (54), wherein the insert tool is operatively connectable to the slaving device (14, 16, 300) via at least one detent element (24, 26, 302), supported movably counter to a spring element (20, 22), which detent element snaps into place in an operating position of the insert tool and fixes the insert tool by positive engagement, characterized in that the insert tool is a circular saw blade (18, 32), the slaving device (12, 14, 300) has a fastening element (42, 306) extending in an axial direction (38) and supported elastically displaceably in the axial direction (38) counter to a spring element (86, 312), for axially fixing a circular saw blade (18), the at least one fastening element (40, 42, 306), extending in the axial direction (38), can be passed through at least one region (58, 60, 62) of an elongated slot (64, 66, 68) of the circular saw blade (18) and in the elongated slot (64, 66, 68) is displaceable in a narrowed region (70,72,74) of the elongated slot (64,66,68), and by way of which the circular saw blade (18) is axially fixable in the elongated slot (64,66,68) via a contact face (76,78, 310a) disposed on the fastening element (40,42,306), and the circular saw blade (18) is connected to the slaving device (12,14,300) in a circumferential direction (34,36) via at least one detent element (24,302) and in the axial direction (38) via at least one fastening element (40, 42, 306), wherein the fastening element (40, 42, 306) and the at least one detent element (24, 302) are separate elements.

2. The machine tool receptacle of claim 1, characterized in that the detent element (24, 26, 302) is displaceable in an axial direction (44) counter to the spring element (20, 22).

3. The machine tool receptacle of claim 1, characterized in that a drive moment can be transmitted via a positive-engagement connection between the circular saw blade (18, 32) and the slaving device (12, 14, 16, 300).

4. The machine tool receptacle of claim 1, characterized in that the detent element (24, 26, 300) can be released from its detent position by an unlocking button (28, 30).

5. The machine tool receptacle of claim 1, characterized in that the circular saw blade (32) is connectable to the slaving device (16) via a tongue-and-groove connection, which is secured by positive engagement via at least one detent element (26) in an operating position of the circular saw blade (32).

6. The machine tool receptacle of claim 1, characterized in that the at least one detent element (24, 302), extending in the axial direction (38), snaps into a recess (46, 48, 50), corresponding to the detent element (24, 302), of a tool hub (52) of the circular saw blade (18) in an operating position of the circular saw blade (18) and fixes the circular saw blade (18) in the circumferential direction (34,36) by positive engagement.

7. The machine tool receptacle of claim 1, characterized in that the at least one detent element (24) extending in the axial direction (38) is secured in a component (56) supported displaceably on the drive shaft (54) counter to the spring element (20).

8. The machine receptacle of claim 1, characterized in that a component (82) forming a bearing face (80) for the circular saw blade (18), in the fastened state of the circular saw blade (18), has a recess (84) in the region of the elongated slot (64, 66, 68), into which recess part of the circular saw blade (18) is pressed elastically, in an operating position of the circular saw blade (18).

9. The machine tool receptacle of claim 1, characterized in that a collar (92), by way of which the circular saw blade (18) can be radially centered, is formed onto a component (90) of the slaving device (14, 300) that forms a bearing face (88) for the circular saw blade (18).

10. The machine tool receptacle of claim 1, characterized in that at least one detent element (302) is integrally formed onto a disc-shaped component (304).

11. The machine tool receptacle of claim 1, characterized in that at least two elements (306) for fixing the circular saw blade (18) in the axial direction (38) are integrally formed onto a disc-shaped.

12. A circular saw blade, which can be connected by stool hub (52, 94), via a slaving device (12,14,16,300) of a machine tool receptacle, to a drive shaft (54) of a circular saw (10), characterized in that the tool hub (52,94) is operatively connectable to the slaving device (12,14,16, 300) via at least one detent element (24,26,302), supported movably counter to a spring element (20,22,312), which detent element snaps into place in an operating position of the tool hub (52, 94) and fixes the tool hub (52, 94) by positive engagement, at least a first recess (46, 48, 50) for a positive-engagement connection to the slaving device (12, 14, 300) in at least one circumferential direction (34, 36), and at least one second recess (64,66, 68), separated from the first recess (46,48,50), for a positive-engagement connection in the axial direction (38) are made in the tool hub (52), wherein the first recess (46, 48, 50) is for connection in the at least one circumferential direction (34, 36) only and not for connection in the axial direction (38), and wherein the at least one second recess (64, 66, 68) is a separate recess for fixing in the axial direction.

13. The circular saw blade of claim 12, characterized in that at least elongated slot (64, 66, 68) is made in the tool hub (52), which elongated slot has one wide region (58, 60, 62) and at least one narrow region (70, 72, 74).

* * * * *